Feb. 11, 1958   D. EDWARDS   2,822,812
DISK TYPE GRAIN THRESHER

Filed Dec. 7, 1953   8 Sheets-Sheet 2

INVENTOR.
Delbert Edwards
BY
Atty.

Feb. 11, 1958

D. EDWARDS 2,822,812

DISK TYPE GRAIN THRESHER

Filed Dec. 7, 1953

INVENTOR.
Delbert Edwards
BY
Atty.

Feb. 11, 1958

D. EDWARDS

2,822,812

DISK TYPE GRAIN THRESHER

Filed Dec. 7, 1953

INVENTOR.
Delbert Edwards

BY

Atty.

Feb. 11, 1958 D. EDWARDS 2,822,812
DISK TYPE GRAIN THRESHER
Filed Dec. 7, 1953 8 Sheets-Sheet 8

INVENTOR.
Delbert Edwards
BY
Atty.

United States Patent Office 2,822,812
Patented Feb. 11, 1958

2,822,812

DISK TYPE GRAIN THRESHER

Delbert Edwards, Condon, Oreg.

Application December 7, 1953, Serial No. 396,385

5 Claims. (Cl. 130—27)

My invention relates to a harvester. The principal purpose of the invention is to produce a harvester for such crops as wheat, barley, oats, rice, etc., that will cut and collect the heads with a minimum of shattering and thresh the seeds from the heads and cut the straw while threshing, fine enough that it may be returned to the soil in a condition that will enable cultivation of the soil without the difficulty of clogging the cultivating tools. My invention is embodied in a machine of the "combine" type which is adapted to do the cutting and threshing and cleaning as a continuous operation so that the seeds are recovered free of chaff and trash and ready for marketing.

The present day combine harvesters utilize the header and a threshing unit with a seed cleaner. It is customary with the header to use a reel which moves the standing crop against the sickle and onto conveyors or drapers that carry the crop up through a header spout into the threshing unit. One of the difficulties with these machines lies in the shattering of the crop by the blows of the reel when the crop is over ripe. Another difficulty of the machine is the handling of the straw or stalks. The threshing machine does not break up the stalks. One of the purposes of the present invention is to provide a machine which is capable of threshing with equal ease and efficiency regardless of whether the straw is long or short and which will deliver the straw cut up finely enough to be readily cultivated and left on the surface of the soil without interfering with the cultivators.

It is a further puropse of my invention to provide a harvesting machine in which the cut crop is threshed and the straw is reduced to short lengths by carrying the cut crop upon a cutter disk having rows of closely spaced cutting teeth on its top surface and passing the disk beneath a stationary cutter having rows of cutter teeth thereon positioned to pass between the disk cutter teeth, both sets of cutter teeth being so arranged as to prevent simultaneous meeting of the disk cutter teeth in any row with corresponding stationary cutter teeth. I have discovered by proper arrangement of the stationary cutter and the disk cutter teeth that I can obtain a smooth flow of the crop through the thresher and efficiently dislodge the seeds from the hulls without cracking and breaking up the seeds while the teeth are also breaking up the straw into short lengths.

It is also the purpose of my invention to provide a harvester wherein the principal carrying force by which the cut crop is moved to the sickle and is moved through the threshing and grain shoe portions of the harvester is an air stream.

Another important purpose of my invention is to provide a harvester wherein the necessity for leveling the threshing portion of the machine when cutting crops on a hillside is avoided and the leveling is confined to only that portion of the machine in which the seeds are being screened.

Other and more detailed objects and advantages of my invention will appear from the following detailed decription and the accompanying drawings which illustrate a preferred form of the invention. It should be understood however, that the drawings and description are illustrative only and are not intended to limit the scope of the invention except insofar as it is limited by the claims.

Figure 1:
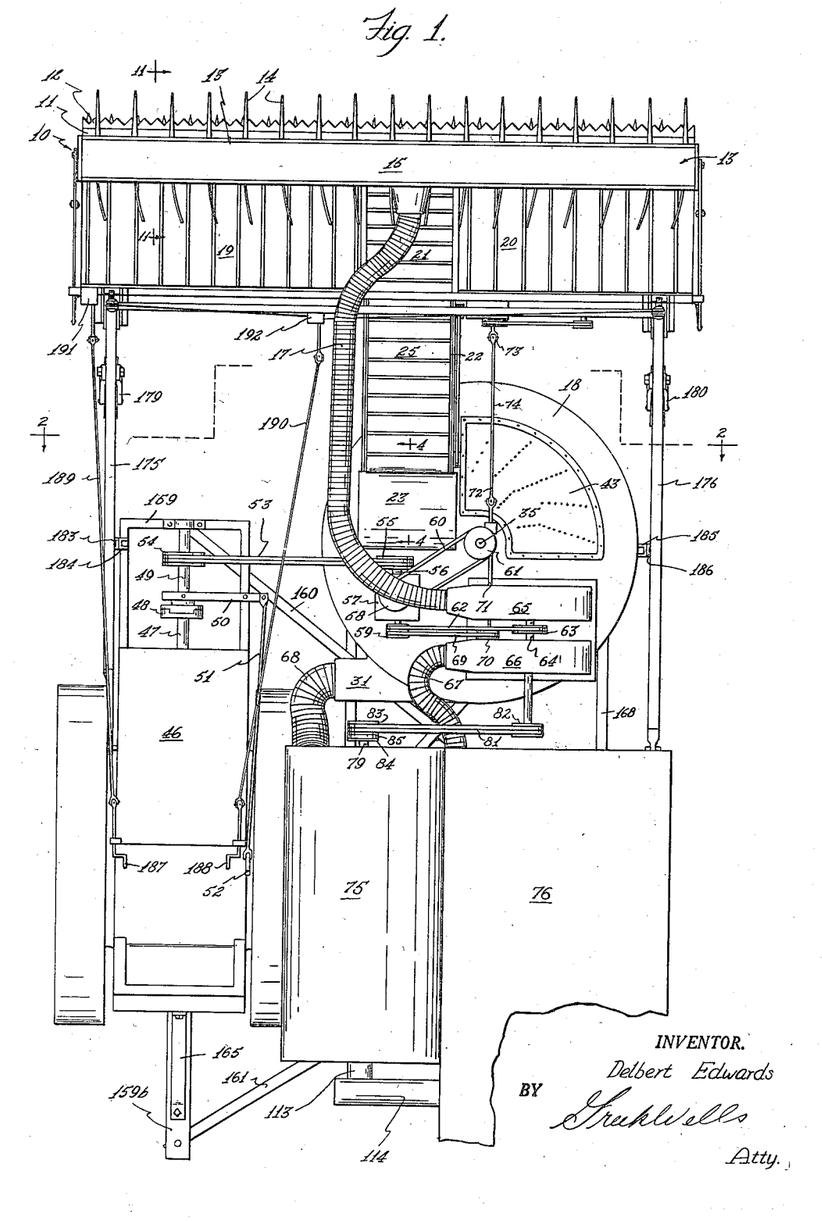
Figure 1 is a plan view of a harvester embodying my invention.
Figure 7:
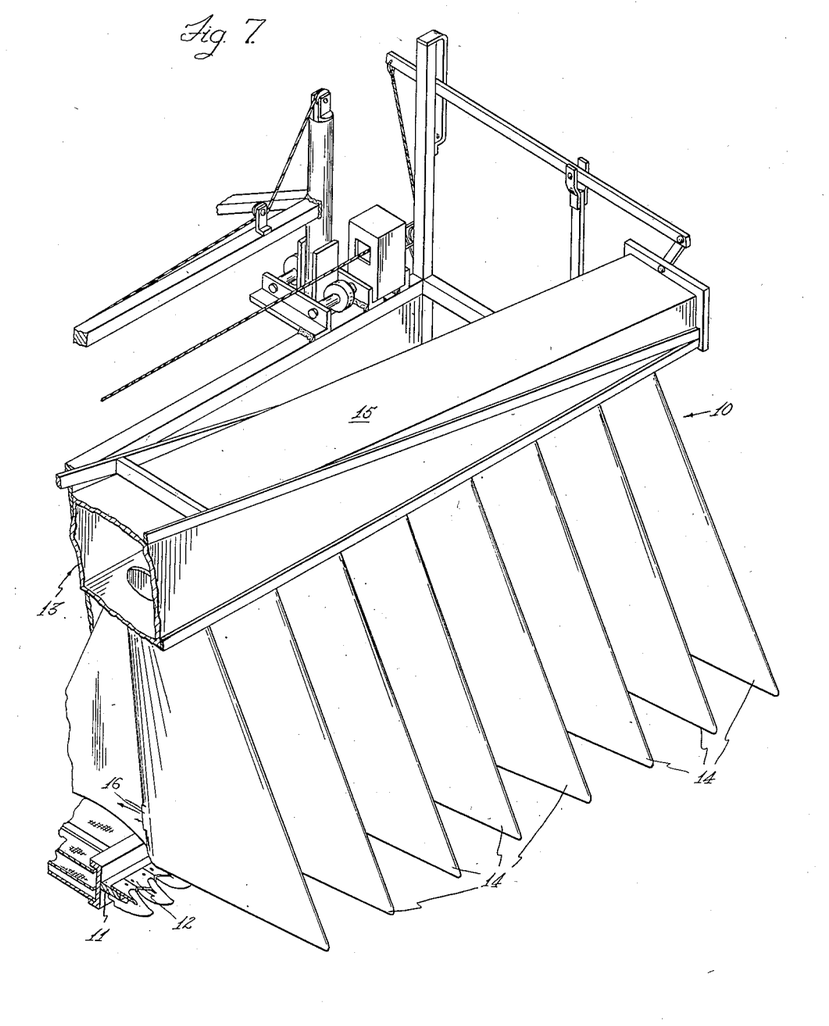
Figure 7 is a fragmentary perspective view partly in section illustrating a part of the header portion of the harvester as it appears from the front.

Referring now in detail to the drawings and in particular to Figures 1 and 7, my improved harvester comprises a header portion 10 having a cutter bar 11, a sickle 12 and a crop dividing and deflecting mechanism 13 for directing the crop against the sickle 12. The dividers 14 of the mechanism 13 enter the standing crop in front of the sickle so as to segregate the crop. Air under pressure is carried from a tubular member 15 of the mechanism 13 down through the dividers 14 and discharged through apertures 16 therein to direct the crop rearwardly against the sickle. Air is supplied to the member 15 through a flexible air conduit 17. The particular details of the header portion 10 form the subject matter of a separate application and are not claimed herein.

Figure 4:
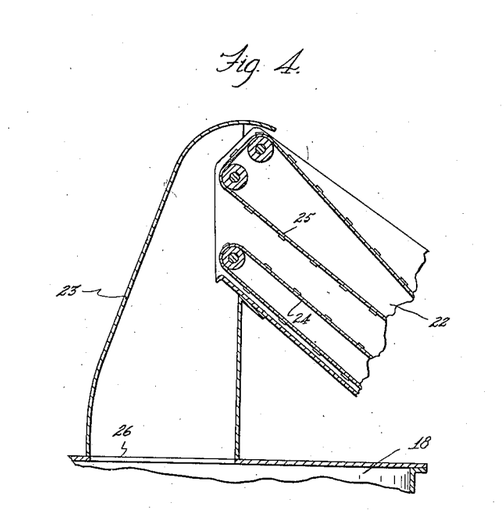
Figure 4 is an enlarged sectional view taken on line 4—4 of Figure 1.

A threshing casing 18 receives the cut crop from the header portion 10. Draper conveyors 19, 20, and 21 convey the cut crop to a header spout 22 which elevates the crop and discharges it into a housing 23 that projects upwardly from the threshing casing 18. The header spout 22, as illustrated best by Figures 1, 2 and 4, utilizes a lower conveyor 24 and an upper conveyor 25 to elevate the crop from the conveyor 21 into the housing 23. The housing 23 is open at its lower end as indicated at 26 (see Figure 6), so that the cut crop falls down into the threshing casing 18. The details of the threshing portion 18 are shown best by Figures 1, 5 and 6. The casing 18 is formed by combining a lower pan 27 with a cylindrical channel that forms an upstanding rim 28 for the pan 27 and a cover plate 29. The cover plate 29 is provided with an inlet opening 30 which aligns with the open bottom portion 26 of the housing 23. A tangential outlet 31 is provided in the pan rim 28 for the casing 18.

Figure 5:
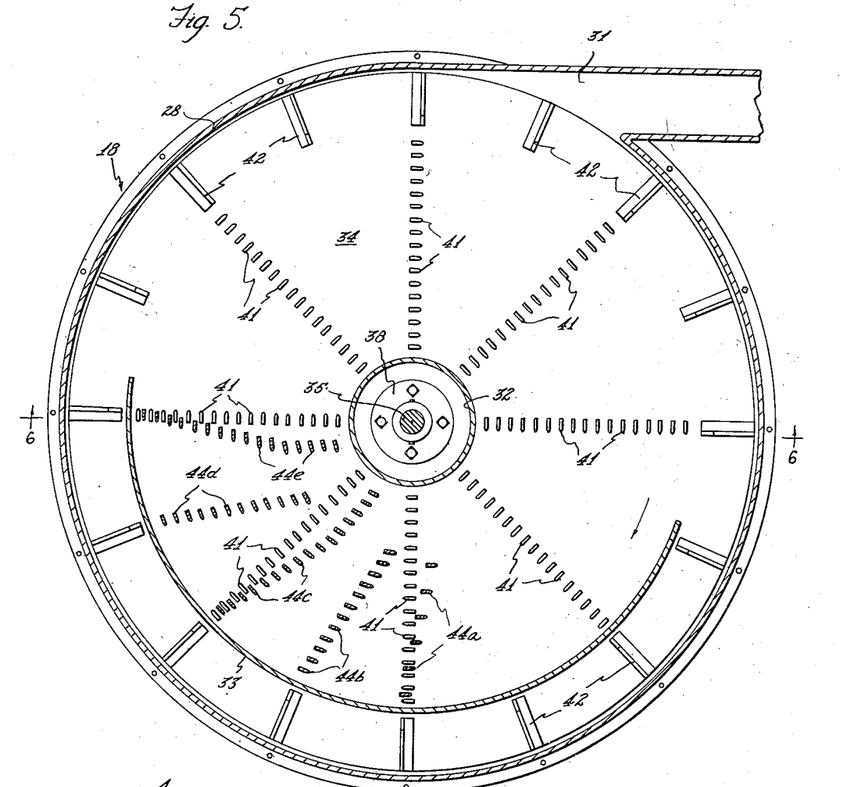
Figure 5 is an enlarged sectional view taken on the line 5—5 of Figure 2 and illustrating the details of the threshing portion of the harvester.
Figure 6:
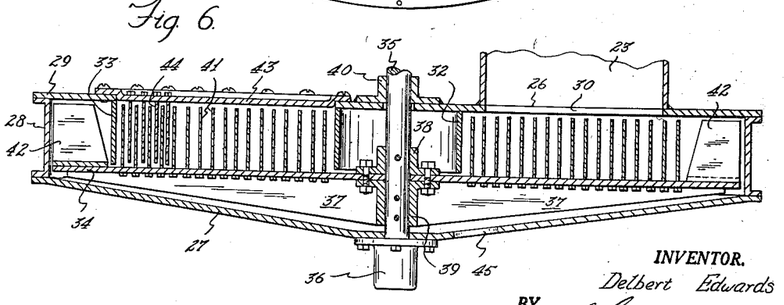
Figure 6 is a sectional view taken on the line 6—6 of Figure 5.

Within the casing 18 the cover plate 29 is provided with a central cylindrical sleeve 32 and with a semi-circular guard 33. A disk 34 is mounted within the casing 18 on a shaft 35. The pan 27 carries a supporting bearing 36 for the shaft 35. The disk 34 has tapered ribs 37 on the bottom thereof to reenforce the disk and to provide for air circulation toward the rim of the pan 27 when the disk 34 is rotated. The disk 34 is secured on the shaft 35 by collars 38 and 39 which are bolted to the disk 34. Another bearing 40 is provided on the cover plate 29 for the shaft 35.

The means for threshing the seeds from the heads of the crop and for cutting up the straw which is brought in with the heads comprises spaced radial rows of teeth 41 which are fixed to the disk 34 and which project upwardly therefrom into close proximity of the lower surface of the plate 29. These rows of teeth extend from a point adjacent the cylindrical sleeve 32 radially outward on the disk 34 to the point just inside the guard 33. The teeth in horizontal cross section are blades which are pointed at their advancing edges, the blades being about one-fourth inch thick radially of the disk 34 and about one inch in width circumferentially of the disk 34. The disk 34 also has upstanding blades 42 secured thereon at intervals about its periphery. The blades 42 act as fan blades and as carriers for carrying the material to the outlet 31 from the inlet 30. The blades 42 lie outside the guard 33.

The cover plate 29 carries a removable segment comprising a plate 43 which is provided with a multiplicity of teeth 44 that extend downward in staggered relation with respect to the teeth 41 on the disk 34. The teeth 44 are essentially of the same size and shape as the teeth 41. The showing in Figure 6 exaggerates the spacing between the lower ends of the teeth 44 and the disk 34 and between the upper ends of the teeth 41 and the supporting plate 43. As illustrated best in Figure 5, the teeth 44 are arranged in such a way that they meet the rows of teeth 41 smoothly and without sudden jamming of several teeth at once. There is a front row 44a of the teeth 44 which is composed of teeth spaced apart so as to mesh with alternate pairs of teeth 41 as the disk 34 rotates. The teeth in the row 44a are offset with respect to a radius of the disk 34 so that the inner stationary tooth will be first to meet a row of the teeth 41. In a similar manner the following rows 44b, 44c, 44d and 44e of the teeth 44 are offset so that any particular row of teeth 41 will not meet a multiplicity of teeth 44 at once. It will be noted that rows 44b and 44d are shorter than the rows 44c and 44e since it is obvious that there will not be as much material to thresh at the inner portion of the disk as there will be toward the outer portion of the disk. All of the teeth 44 are spaced inwardly from the guard 33. The teeth in the rows 44b, 44c, 44d, and 44e are spaced the same distance apart as the teeth 41 in the disk. The rows are so spaced that all teeth in a particular row of teeth on the disk will have passed one stationary row before any of them engage the next stationary row.

With the construction just described it is believed to be evident that the cut crop falling into the casing 18 through the inlet opening 30, will be subjected to the vigorous threshing action as the teeth 41 pass between the teeth 44. The straws will be broken up into short segments. Since the disk 34 is rotating at a relatively high speed, it tends to carry the material on it outwardly so that as soon as the material passes the guard 33, it moves outward between the blades 42 where its speed is increased until it is thrown off tangentially through the outlet 31. The ribs 37 on the bottom of the disk 34 act as fan blades to maintain an upward air flow at the periphery of the disk 34 so as to prevent the threshed seeds from falling down beneath the disk 34. The bottom pan 27 has apertures 45 therein for admitting air in the desired quantities in the space beneath the disk 34. Since the stationary teeth 44 are suspended from the plate 43, the natural tendency for the material being threshed is to fall down and to be carried past the teeth 44 by the disk. The straw being lighter than the seeds will segregate from the seeds so as to free the disk surface and allow the seeds to settle thereon.

Figure 2:
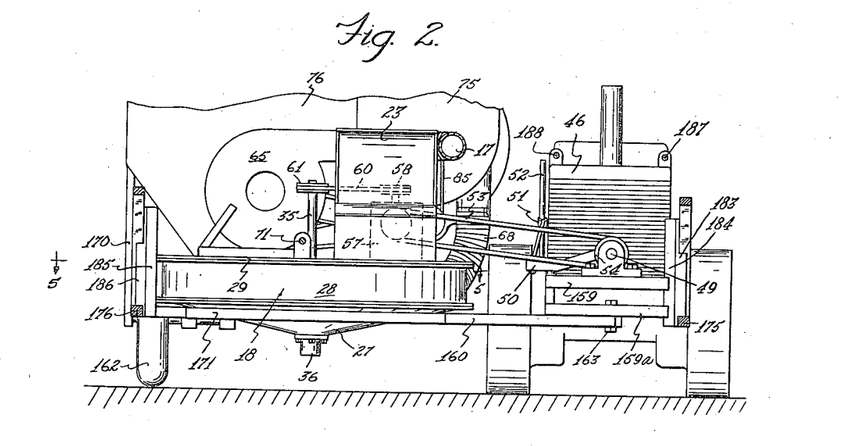
Figure 2 is a front sectional view taken substantially on the line 2—2 of Figure 1.

As illustrated best by Figures 1 and 2, the power for operating the disk 44 and for supplying air to the conduit 17, and additional air for the grain cleaning, is obtained from the power take-off of a powered vehicle 46. The power take-off shaft from the vehicle is illustrated at 47. A clutch 48 connects the driven shaft 49 to the power take-off shaft 47. A clutch lever 50 is controlled by the operator through a link 51 and a hand lever 52. A main drive belt 53 is driven from a pulley 54 from the shaft 49 and drives a pulley 55 that is mounted on a shaft 56 of a gear box 57. The gear box 57 has suitable connections to drive a pulley 58 on the top thereof and a double pulley 59 at the end opposite the pulley 55. The pulley 58 drives a belt 60 which drives a pulley 61 on the shaft 35. The pulley 59 drives a belt 62 which drives a pulley 63 on a fan shaft 64. The fan shaft 64 drives two fans 65 and 66. The fan 65 furnishes air to the conduit 17 to supply the mechanism 13 with its dividers 14. The fan 66 supplies air through a flexible conduit 67. The pulley 59 also drives a belt 69 which operates a pulley 70 to supply power to a shaft 71. The shaft 71 is connected by universal joints 72 and 73 and a second shaft 74 to the drive mechanism on the header unit 10 for operating the sickle 12 and the conveyors that carry the cut crop to the housing 23.

A conduit 68 leads from the tangential outlet 31 into a grain cleaning casing 75. The air flow through the flexible conduit 68 is ample to carry the threshed material into the casing 75.

The detailed construction of the grain cleaning mechanism in the casing 75 will now be described. This casing 75 is mounted alongside and secured to a grain box 76.

Referring particularly to Figures 8 to 13, the casing 75 has bearings 77 and 78 at the ends thereof to mount a shaft 79 for a spiked cylinder 80. The shaft 79 is driven from the shaft 64 by belts 81 and pulleys 82 and 83. The shaft 79 also has a pulley 84 thereon which drives a belt 85 that drives a pulley on a shaft 87 of a screw conveyor 88 that is mounted in the bottom of the casing 75

Figure 8:
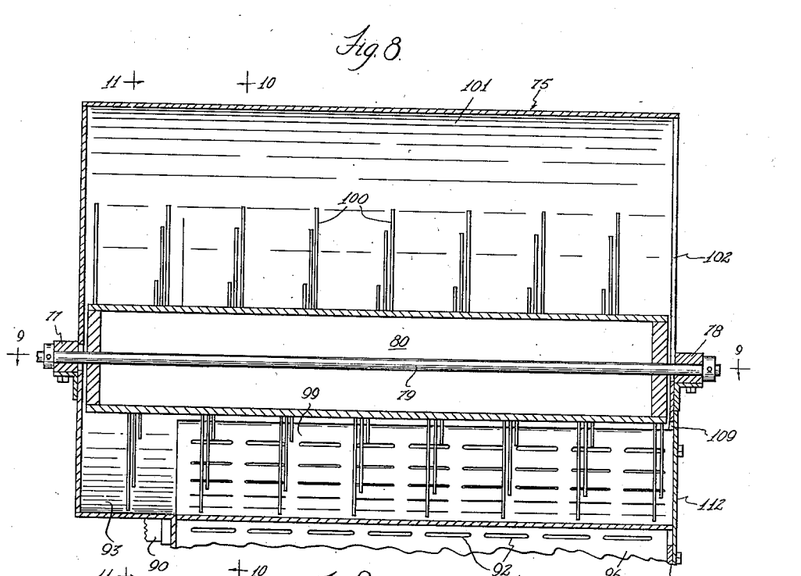
Figure 8 is a longitudinal sectional view taken in a vertical plane through the grain shoe or cleaning device that separates the grain, or seed, from the straw and chaff.
Figure 9:
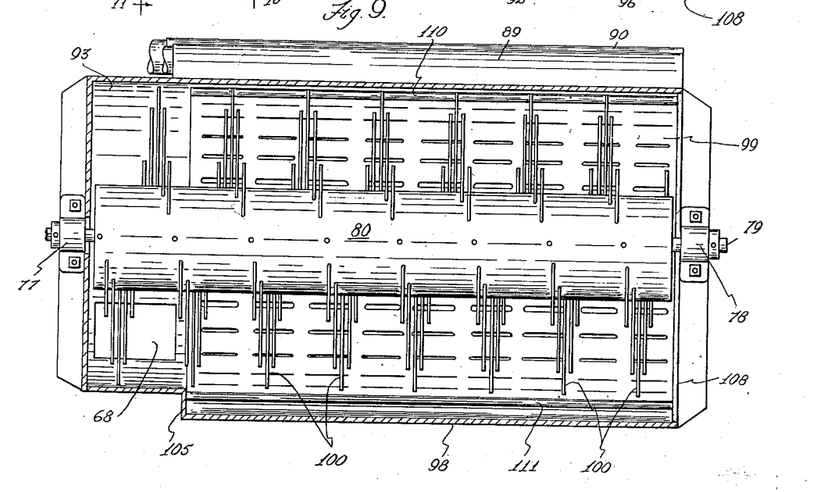
Figure 9 is a sectional view taken on the line 9—9 of Figure 8.
Figure 10:
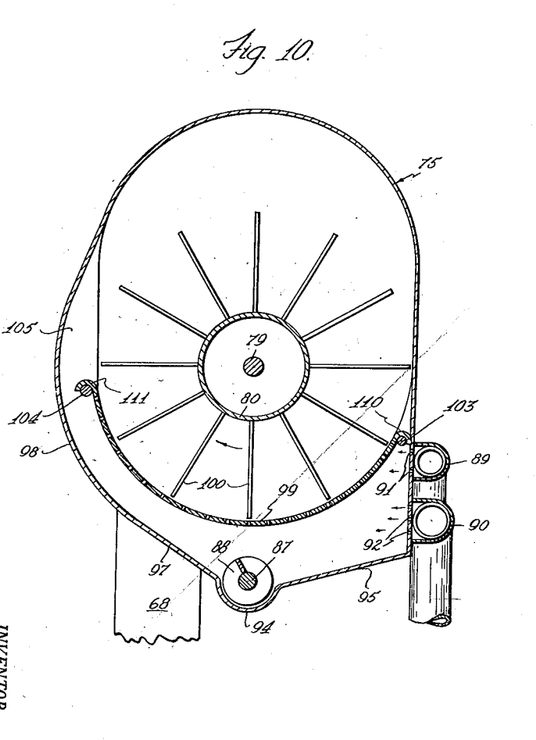
Figure 10 is a sectional view taken on the line 10—10 of Figure 8.
Figure 11:
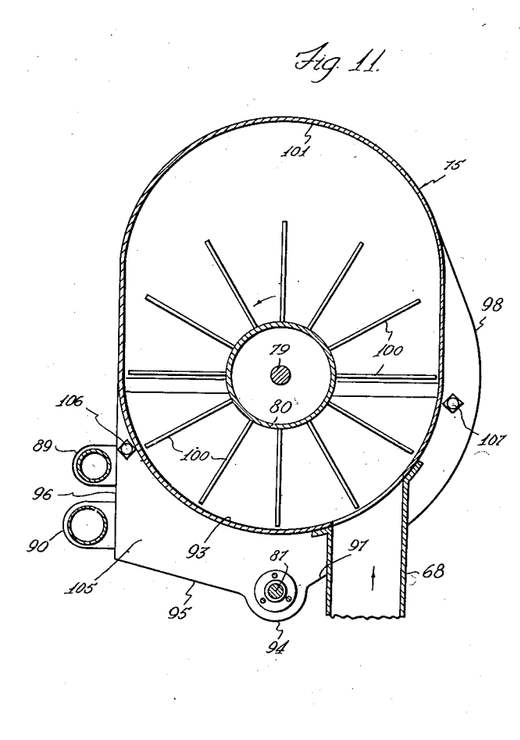
Figure 11 is a sectional view taken on the line 11—11 of Figure 8.
Figure 12:
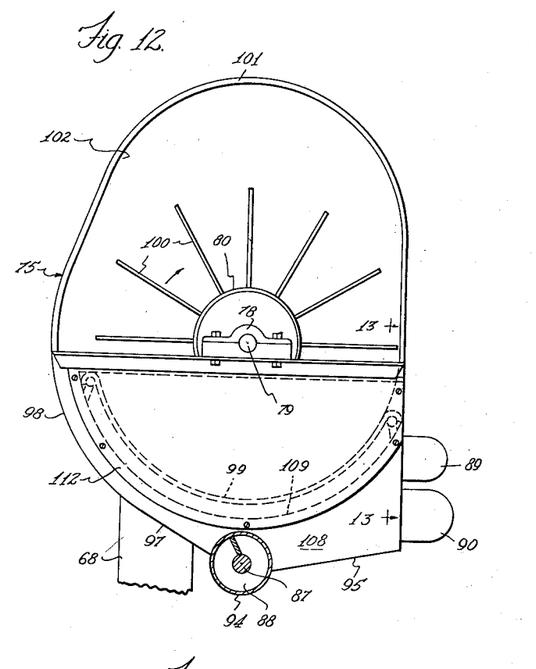
Figure 12 is an end view with the discharge outlet in section looking at the discharge end of the grain shoe.
Figure 13:
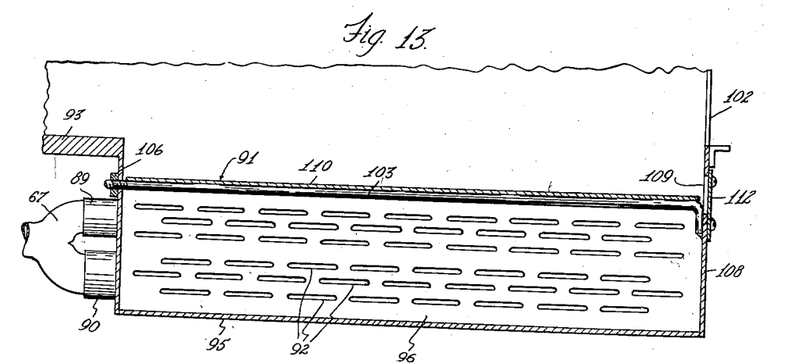
Figure 13 is a sectional view taken on the line 13—13 of Figure 12.

The air supply conduit 67 is connected at the casing 75 to two air distributing channels 89 and 90 that extend along the side of the casing 75 and supply air to the casing 75 through openings 91 and 92 respectively.

The casing 75 is provided, at the end where the conduit 68 opens into it, with a lower semi-cylindrical wall 93. This wall extends only a short distance past the inlet of the conduit 68 into the casing 75. For the rest of the length of the casing 75 the bottom wall is dropped down to provide a trough 94 for the screw conveyor 88. At one side of the trough 94 a bottom wall section 95 extends laterally and upwardly to a vertical side wall 96. This side wall 96 contains the apertures 91 and 92. The air channels 89 and 90 are secured to the exterior of the wall 96 over the apertures 91 and 92 respectively. On the other side of the trough 94, the bottom wall comprises a sloping section 97 that merges with a cylindrical wall section 98 that curves upwardly past the level of the shaft 79. The radius of the wall section 98 is somewhat greater than the radius of the wall 93.

The enlarged bottom space provided by the wall sections 94, 95, 97 and 98 is utilized for mounting a grain screening means 99. This screening means may take the form of one or more screens suitable to pass the grain or seeds desired and to keep larger material from passing through. In the drawings one screen is illustrated. Any known types of screens such as the commonly used lip screen may be employed.

The cylinder 80 has a multiplicity of spikes or rods 100 mounted thereon in a helical pattern that will lift the straw, etc. which is blown into the casing 75 from the conduit 68 and move this material upwardly and lengthwise of the casing. The spikes are of such length as to just clear the semi-cylindrical wall 93 and the surface of the screening means 99. The cylinder 80 is rotated in the direction indicated by the arrows in Figures 10, 11 and 12. As the cylinder 80 is rotated the spikes 100 separate the grain from the straw and keep the straw open enough to allow the grain to reach the screening means 99.

The upper wall section 101 of the casing 75 is raised above the spikes 100 to permit the excess air, and light chaff and dust to move endwise of the casing to an opening 102 at the discharge end of the casing 75. The straw and air borne chaff pass out through the opening 102.

The air channels 89 and 90 supply ample air beneath the screening means 99 to blow any light fine material that gets through the screening means 99 up the wall section 98 past the screening means 99, into the upper part of the casing 75. The entire supply of air to the casing 75 is directed so as to cooperate with the rotating spiked cylinder 80 to set up a continuous air and straw movement toward the outlet opening 102.

The screening means 99 is carried by two rods 103 and 104. These rods extend through the end wall 105 of the casing at the sides of the semi-circular wall 93. Nuts 106 and 107 secure the rods. At the other end of the casing 75 the rods are bent down and fastened to the lower end wall 108. The end wall 108 has an opening indicated at 109 so the screening means 99 can be pulled out. The screening means 99 has hook portions 110 and 111 which rest on the rods 103 and 104. The opening 109 is covered by a removable cover plate 112.

The screw conveyor 88 extends beyond the discharge end of the casing 75 in a housing 113. A second screw conveyor 114 receives the grain and conveys it into grain box 76.

There is no necessity for levelling this threshing machine. The nature of its construction and operation is such that it is not adversely affected by the amount of angular displacement encountered on fields where the hillside combined harvesters are now employed. The support of the casing 18 and the grain box 76 is by a supporting framework that maintains the relative positions of these parts to each other and to a longitudinal center line of the frame 159 of the powered vehicle 46.

Figure 3:
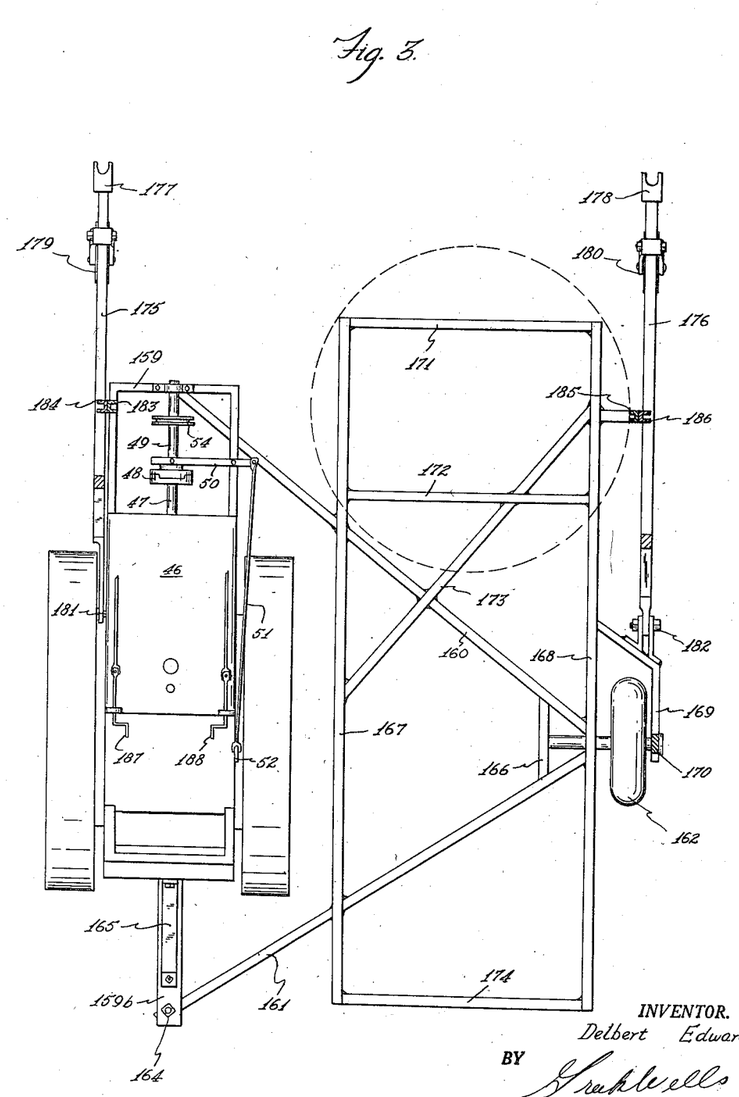
Figure 3 is a plan view of the frame portion of the machine showing the manner in which it is supported and attached to a powered vehicle.

The supporting framework for the casing 18 and the grain box 76 is illustrated best in Figures 2 and 3. Two main supporting bars 160 and 161 are provided to connect a support wheel 162 to the front and rear ends of the vehicle frame 159. The bar 160 is removably secured to a cross member 159a of the frame 159 by a bolt 163. The bar 161 is secured to a rearwardly extending bar 159b of the frame 159 by a bolt 164. A brace 165 is provided for the bar 159b. The bars 160 and 161 are joined by a cross brace 166 and two frame members 167 and 168 that support the threshing casing 18 and the grain box casing 76. The wheel 162 has its axle secured to the members 166 and 168. An outer bracket 169 extends forwardly from the outer end of the axle 162a and then inwardly to the member 168. An upright brace and support 170 extends upwardly from the bracket 169 to the grain box casing 76. The two frame members 167 and 168 are connected at their front portions by cross pieces 171 and 172 and are further braced by a diagonal brace 173. The rear ends of the members 167 and 168 are connected by a cross piece 174. The casings 18 and 76 are mounted on the framework just described.

The header 10 is supported by two frames 175 and 176, the front ends of which have brackets 177 and 178 that are attached to the header 10. The frames 175 and 176 are provided with supporting caster wheels 179 and 180 near the brackets 177 and 178. The rear end of the frame 175 is pivoted at 181 on the vehicle frame 159. The frame 176 has its rear end pivoted at 182 to the bracket 169. Upright wear bars 183 and 184 on the vehicle frame 159 and the frame 175, and similar upright wear bars 185 and 186 on the frame member 168 and the frame 176, provide lateral bracing of the frames 175 and 176 with freedom for pivotal movement of these frames at their pivots 181 and 182.

The raising and lowering of the header 10 and its crop deflecting mechanism 13—15 is controlled by two hand cranks 187 and 188 and shafts 189 and 190 which lead to the control units 191 and 192 that are provided on the header 10. The details of this mechanism are shown in my application on the header referred to hereinbefore.

The harvester which has been described in detail is characterized by the utilization of air force as a means of transporting the threshed material and operating the separating mechanism, the air force being to a substantial degree, obtained from the threshing operation where the crop is carried on a rotating support and the seeds which are heavier than the straw and chaff are discharged at a relatively high speed into the conduit which transfers the material from the thresher to the separator. The straw and chaff are moved outwardly on the disk 34 by centrifugal force and by the air movement due to the fan blades 42 at the periphery of the disk 34. The straw and chaff are blown out with the grain through the tangential outlet conduit 31 to the separator casing 75. The straws are chopped fine enough in the threshing operation to carry through the machine without clogging. The discharged chopped straw goes back on the field in such fine condition that it does not interfere with later cultivation.

By carrying the cut crop on the rotating disk while it is threshed and effecting the threshing by passing the teeth on the top of the disk between depending stationary teeth, I am able to cut up the straw and thresh the seeds out of the heads with a minimum of cracked seeds. The seeds, when threshed out, drop down onto the disk and move radially outward on the disk below the stationary teeth which have their lower ends spaced from the disk.

It is believed that the nature and advantages of my invention will be clear from the foregoing description. Having thus described my invention, I claim:

1. In a harvester of the character described, a threshing unit comprising a crop supporting disk, means mounting the disk to rotate on an upright axis, said disk having circumferentially spaced rows of long straw-cutting teeth projecting upwardly from its top surface, the teeth in each row being spaced apart radially of the disk at least far enough to pass another like tooth between them, means to feed cut grain stalks and heads onto said disk, means to rotate the disk, and a housing for said disk having a member overlying a portion of the disk and provided with a multiplicity of long straw cutting teeth depending therefrom and positioned to pass the disk supported teeth between them, the disk having fan blades thereon and the housing having a guard between the depending teeth and the fan blades, the housing also having a tangential outlet spaced from the guard through which the fan blades blow the cut straw and the grain together out of the housing after passing them once through the depending teeth.

2. In a harvester of the character described, a threshing unit comprising a crop supporting disk, means mounting the disk to rotate on an upright axis, said disk having circumferentially spaced rows of long straw-cutting teeth projecting upwardly from its top surface, the teeth in each row being spaced apart radially of the disk at least far enough to pass another like tooth between them, means to feed cut grain stalks and heads onto said disk, means to rotate the disk, and a housing for said disk having a member overlying a portion of the disk and provided with a multiplicity of long straw cutting teeth depending therefrom and positioned to pass the disk supported teeth between them, the teeth depending from said member being set in rows that are angularly disposed to any row of teeth on the disk when meshing therewith, whereby to provide successive meshing of the teeth in a row on the disk with the teeth in a row on the member.

3. In a harvester of the character described, a threshing unit comprising a shallow circular housing pan, a circular crop supporting disk mounted for rotation in said pan and the pan having its rim extending above the disk in juxtaposition to the outer edge of the disk, said pan rim having a tangential outlet, a cover for the pan and disk having an opening for admitting the crop to be threshed on to said disk, said disk and a portion of the cover having teeth thereon overlapping with each other to break up the crop, said disk having radial ribs on its bottom surface to create an up draft of air between the disk and the pan rim, said disk also having upwardly extending fan blades at its periphery, and said cover having a depending guard extending part way around the cover between the teeth on the cover and the fan blades on the disk.

4. In a harvester of the character described, a threshing unit comprising a shallow circular housing pan, a circular crop supporting disk mounted for rotation in the pan, the pan having its rim extending above the disk in juxtaposition to the outer edge of the disk, said pan having an outlet opening in the rim, a discharge conduit secured to said pan at the opening, a cover for the pan and disk, said cover having an opening therein through which the crop to be threshed is dropped upon said disk, the cover having a removable segment between the crop opening and the outlet opening and spaced from the outlet opening, said segment having spaced rows of long straw cutting teeth depending therefrom, the lower ends of said teeth terminating above the disk and close to the disk to permit seeds freed from their shells to pass beneath the teeth, said disk having spaced radial rows of long straw cutting teeth projecting upwardly therefrom and positioned to pass between adjacent teeth in the rows on said segment, the outer teeth in the rows of teeth on the disk being spaced inward from the periphery of the disk, the cover having a depending semi-circular guard extending downwardly to the disk outwardly of the teeth on said segment.

5. In a harvester of the character described, a threshing unit comprising a shallow circular housing pan, a circular crop supporting disk mounted for rotation in the pan, the pan having its rim extending above the disk in juxtaposition to the outer edge of the disk, said pan having an outlet opening in the rim, a discharge conduit secured to said pan at the opening, a cover for the pan and disk, said cover having an opening therein through which the crop to be threshed is dropped upon said disk, the cover having a removable segment between the crop opening and the outlet opening and spaced from the outlet opening, said segment having spaced rows of long straw cutting teeth depending therefrom, the lower ends of said teeth terminating above the disk and close to the disk to permit seeds freed from their shells to pass beneath the teeth, said disk having spaced radial rows of long straw cutting teeth projecting upwardly therefrom and positioned to pass between adjacent teeth in the rows on said segment, the outer teeth in the rows of teeth on the disk being spaced inward from the periphery of the disk, the cover having a depending semi-circular guard extending downwardly to the disk outwardly of the teeth on said segment and the disk having upstanding fan blades thereon extending inwardly from the periphery of the disk and terminating outwardly of the outer teeth on the disk to pass outside said guard.

References Cited in the file of this patent

UNITED STATES PATENTS

| | | |
|---|---|---|
| 126,117 | Wemple | Apr. 23, 1872 |
| 683,174 | Goodhue | Sept. 24, 1901 |
| 1,103,324 | Sooy et al. | July 14, 1914 |
| 1,646,453 | Hitchcock | Oct. 25, 1927 |
| 1,702,323 | Stevens et al. | Feb. 19, 1929 |
| 1,884,153 | Nye | Oct. 25, 1932 |
| 1,900,269 | Altgelt et al. | Mar. 7, 1933 |
| 2,002,205 | Johnston et al. | May 21, 1935 |
| 2,147,267 | Pierson | Feb. 14, 1939 |
| 2,320,557 | Betzen | June 1, 1943 |